United States Patent Office 3,039,720
Patented June 19, 1962

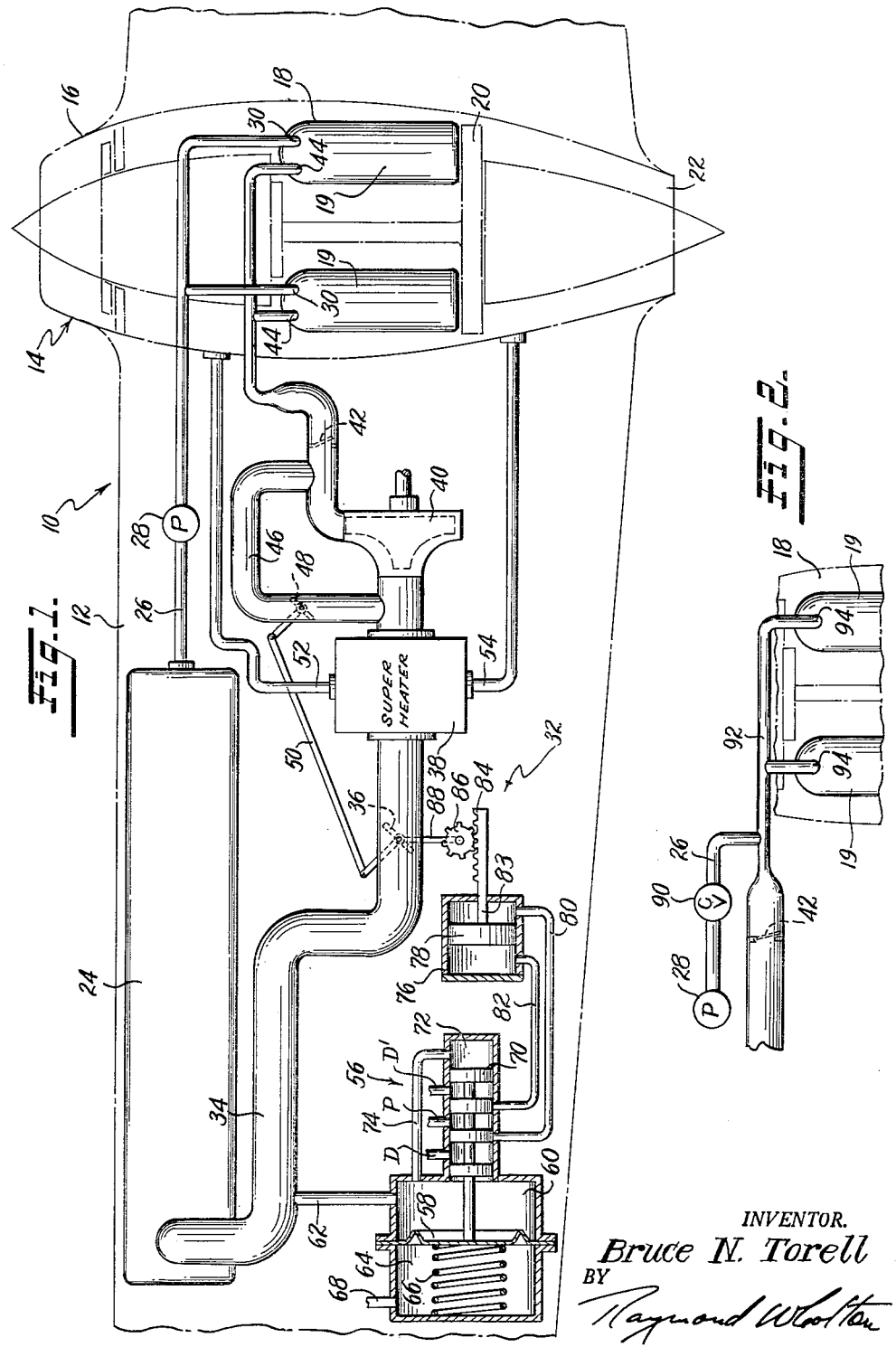
June 19, 1962 B. N. TORELL 3,039,720
VAPOR BURNING SYSTEM FOR AIRCRAFT POWER PLANT
Filed Oct. 10, 1960
INVENTOR.
Bruce N. Torell
BY
ATTORNEY

3,039,720
VAPOR BURNING SYSTEM FOR AIRCRAFT POWER PLANT
Bruce N. Torell, Wethersfield, Conn., assignor to United Aircraft Corporation, East Hartford, Conn., a corporation of Delaware
Filed Oct. 10, 1960, Ser. No. 61,476
5 Claims. (Cl. 244—74)

This invention relates generally to a vapor burning system and more specifically to a liquid fuel system for a supersonic aircraft propelled by a turbojet or a ramjet power propulsion system.

As is well known, skin friction in supersonic aircraft and missiles creates a very high temperature condition, generally referred to as a "thermal barrier," resulting from the frictional resistance offered by the ambient atmosphere to the high speed of the aircraft. Among other undesirable conditions created by such high temperature, is the vaporization of the liquid fuel carried by the aircraft. Such fuel vaporization absorbs a part of the heat resulting from skin friction, but the build up of the vapor pressure in the fuel tank or tanks presents a serious problem. Ramjet and turbojet engines of the type ordinarily used for propulsion of high speed aircraft or missiles, either manned or unmanned, are designed to be operated on liquid fuel delivered in an atomized state into the combustion chambers, and it becomes necessary to dispose of the vaporized fuel, as for instance, by allowing it to escape through pressure relief valves into the ambient atmosphere.

It is an object of this invention, therefore, to provide, in a high speed aircraft, a ramjet engine or a turbojet engine adapted to burn both liquid and gaseous fuels, to avoid the waste heretofore permitted.

It is a further object to provide a novel fuel burning system for high speed aircraft or missiles in which the fuel tank or tanks are pressurized by vaporization of a portion of the fuel, the vapor in excess of a predetermined pressure being vented and fed to the engine.

It is a still further object to provide, in a system of the type described in the preceding paragraph, a control system, responsive to the vapor pressure in the fuel tank or tanks, to feed the vapor under increased pressure to the liquid fuel burners, or to separate gas burners, of the combustion chambers of the jet engine.

It is a still further object to provide, in a system of the type described above, means to prevent the liquefaction of the fuel vapor when its pressure is raised.

The specific nature of the invention, as well as other objects and advantages thereof, will be obvious from a consideration of the following description in connection with the annexed drawings which show, for purposes of illustration, two embodiments of the invention, in which:

FIG. 1 illustrates a schematic representation of one embodiment of the invention as applied to an aircraft or missile powered by a turbojet engine, having separate liquid fuel and gaseous fuel burners; and FIG. 2 is a fragmentary schematic modification of the aircraft or missile of FIG. 1 showing a jet engine having common liquid and gaseous fuel burners.

In the embodiment of the invention shown in FIG. 1, the numeral 10 designates a high speed aircraft or a missile, including a wing 12 and a power plant in the form of a turbojet engine 14. The engine 14 includes a compressor section 16, a combustion chamber section 18, a turbine 20 connected in driving relation with the compressor, and a reaction nozzle 22 through which the exhaust products of combustion, discharging from the turbine 20, escape to atmosphere to furnish the reactive thrust.

The missile 10 also includes a liquid fuel tank 24, which may be carried in the wing 12 or in the fuselage in a position where it may absorb heat of skin friction, as known in the art. Liquid fuel is fed from the tank 24 by way of a feed line 26 having a pump 28, delivering to a plurality of burners 30 into a series of combustors 19 arranged in a circle in the combustion chamber section about the longitudinal axis of the power plant. The supply of fuel may be controlled by a conventional fuel control system, not shown, and forming no part of the present invention.

Aircraft and missiles of the type under consideration travel at extremely high speeds, resulting in the heating of the skin by air friction. This heating has presented a problem in the art, causing, among other objectionable results, the vaporization of the liquid fuel in the fuel tank.

This invention takes advantage of the vaporization of the liquid fuel to dissipate the frictional heat on the skin, and utilizes the vaporized fuel to provide additional thrust in the power plant. Toward this end, the invention provides a vaporized fuel feeding system 32 including an independent vaporized fuel supply conduit 34 to the jet engine. The supply conduit 34 is connected with the upper part of the fuel tank 24 to draw off the vaporized fuel, and may include conventional liquid separating means, not shown, to prevent the accidental admission of liquid fuel. Arranged in series in the supply conduit 34, in the direction of fuel flow, are a throttle valve 36, a superheater 38, a centrifugal pump 40, and a check valve 42. The supply conduit 34 discharges into a plurality of auxiliary burners 44, one in each combustor 19 of the combustion chamber section 18.

A bypass conduit 46 around the pump 40 connects the downstream or discharge end of the pump with the upstream or inlet end to discharge a portion or all of the pump delivery during certain conditions of operation, as will be described more fully hereinafter. A valve 48 in the bypass 46 controls the bypass of fuel from the pump delivery side to the inlet side. The valve 48 is connected with the throttle valve 36 by a connecting link 50 in such a manner that the valve 48 is caused to close when the valve 36 opens, and vice versa.

In operation, the pump 40 is maintained continuously in operation, and may be driven from a suitable connection from the turbine shaft of the jet engine. Vapor collected in the top of the fuel tank 24 escapes through the conduit 34, past the throttle valve 36, through the superheater 38 and pump 40 toward the jet engine 14. If the output or delivery pressure of the pump 40 is sufficiently high, the check valve 42 is forced open against the back pressure of the combustion chamber section and the vaporized fuel will be fed to the auxiliary burners 44 in the combustors 19 to supplement or to replace the liquid fuel fed to the burners 30.

Since vapor pressure is a direct function of temperature, an increase in vapor pressure by the centrifugal pump 40 without a corresponding increase in temperature would cause liquefaction of the vapor, at least in the low pressure ranges. In order to prevent such liquefaction, a heating fluid is passed through the superheater in heat exchange relation with the vapor to superheat the vapor prior to compression. Any suitable source of heat may be used, and in the preferred arrangement a pressure tap is taken from the discharge end of the compressor 16 where the air is at an elevated temperature. Some compressed air is bled from the discharge of the compressor 16 by conduit 52, heat exchanger 38 and conduit 54 to some low pressure point in the power plant, such as, for example, the discharge nozzle 22. In this manner, the vaporized fuel is superheated prior to compression, to a temperature sufficiently high to assure that the fuel will remain in its vaporized state when its pressure is raised. It should be understood however, that it is within the scope of this invention to provide an inefficient type of centrifugal compressor 40 in which the work of compression raises the temperature of the vaporized fuel while increasing the pressure to a lesser degree.

The vaporized fuel feeding system includes means to control the rate of vaporized fuel feed as a function of the vaporized fuel pressure. The control means is designated in its entirety by the reference numeral 56 and comprises a pressure responsive diaphragm 58 within a pressure chamber 60 connected with the supply conduit 34 by way of a branch line 62. One side of the diaphragm 58 is exposed to the vapor pressure in the pressure chamber 60, and the other side of the diaphragm is subject to ambient atmospheric pressure in a chamber 64 connected with the atmosphere by a connection 68. A spring 66 in the chamber 64 augments atmospheric pressure. In operation, vapor pressure in the chamber 60 in excess of atmospheric pressure and spring pressure 66, causes a movement of the diaphragm 58 toward the left, and a decrease in vapor pressure and/or an increase in atmospheric pressure, produces a movement of the diaphragm toward the right.

The diaphragm is connected with a pilot valve 70 of a servomotor system, the pilot valve having three spaced valve elements connecting flow of pressure fluid from a pressure source P and the drain of pressure fluid to one of the drains D and D'. The pilot valve includes a pressure balancing chamber 72 which is connected by a conduit 74 with the pressure chamber 60 to equalize the forces on the ends of the pilot valve. A servomotor 76, having a piston 78, is connected with the pilot valve 70 by a pair of conduits 80 and 82 which admit pressure fluid to or exhaust pressure fluid from one side or the other side of the piston 78 in dependence on the position of the pilot valve.

Piston 78 includes a piston rod 83 extending through an end wall of the cylinder 76, the rod carrying a rack 84 cooperable with a pinion 86 connected with the throttle valve 36 by a shaft 88.

The operation of the vapor pressure responsive control system 56 is as follows: When there is no vapor pressure in the top of the fuel tank 24, or a pressure less than the pressure for which the spring 66 is loaded, the force of atmospheric pressure and the force of the spring 66 will predominate and urge the pilot valve toward the right, which will place conduit 80 in communication with the drain D and the conduit 82 in communication with the pressure source P. The piston 78 is moved toward the right end of the cylinder 76, causing complete closing of the throttle valve 36 and full opening of the bypass valve 48. As the pump 40 is continuously in operation, any vapor present in the conduit 34 between the heat exchanger 38 and the closed valve 42 is circulated from the discharge end of the pump, through the bypass line 46 to the pump inlet, serving to prevent heating up of the vapor and avoiding surge conditions in the pump. The valve remains closed until the vapor pressure is sufficiently high to overcome atmospheric pressure and the pressure of loaded spring 66 on the diaphragm 58. When the latter condition occurs, the pilot valve 70 is moved toward the left to a position in which the conduit 80 communicates with the pressure source P and the conduit 82 communicates with the drain D', producing a movement of the piston 78 toward the left, an opening movement of the throttle valve 36 and a closing movement of the bypass valve 48. It is to be understood that the servomotor system includes a conventional follow up whereby the position assumed by the piston 78, as well as the valves 36 and 48 operated thereby, is a function of the position of the diaphragm 58 and a function of the vapor pressure in the pressure chamber 60. As the valve 36 continues to open and the valve 48 continues to close, the pressure on the discharge end of pump 40 increases until the pressure exceeds the pressure in the auxiliary burners 44, whereupon the check valve 42 opens to supply vaporized fuel under pressure to the auxiliary burners to augment the liquid supply fed by the main burners 30. The bypassing of small quantities of vaporized fuel by the valve 48 avoids the creation of surge conditions in the pump. It may be seen, therefore, that the vapor pressure responsive control 56 operates the valves 36 and 48 as a function of vapor pressure, to supply vaporized fuel at a rate to maintain a predetermined maximum pressure in the top of the fuel tank, and that the bypass valve 48 gradually closes with increased rate of vapor pressure feed to prevent surge conditions in the feed line. It is evident that, when conditions are such that the vapor pump 40 supplies fuel to the jet engine, the supply of liquid fuel by the pump 28 can be reduced, and the supply of fuel by the pump 28 can be so regulated to decrease the fuel delivery as the rate of vaporized fuel delivery is increased, whereby the combined fuel supplies of the two fuel feeding systems meet the power requirements.

FIG. 2 illustrates a modified form of the arrangement of FIG. 1 in which the supply of liquid fuel and vaporized fuel is fed to a single system of burners. The liquid fuel supply and the vaporized fuel supply are fed to a manifold 92 in the combustion chamber section 18 of a jet engine, and discharged from a plurality of burners 94 into the combustors 19. A check valve 90 in the liquid fuel supply line, downstream from the pump 28, prevents reverse flow in the liquid fuel supply line.

It is evident that various other modifications in the form and arrangement of the different parts are obvious to persons skilled in the art without departure from the scope of the invention as defined in the annexed claims.

I claim:

1. In a high speed aircraft, a jet propulsion engine; a liquid fuel tank exposed to the heat produced by skin friction whereby a portion of the fuel is vaporized to pressurize the fuel in the tank; means including a main supply conduit to supply liquid fuel from said fuel tank to the combustion chamber of the jet propulsion engine; and auxiliary fuel feeding means, operative in response to a pressure of the vaporized fuel above a predetermined minimum vapor pressure to supply vaporized fuel under pressure to the combustion chamber, said auxiliary fuel feeding means including an auxiliary supply conduit, a normally closed throttle valve in said conduit, said valve being opened in response to a predetermined minimum vapor pressure in the fuel tank, a superheater in said auxiliary supply conduit downstream from said valve, a pump in said auxiliary supply conduit downstream from said superheater, and means to supply a heated medium to said superheater.

2. In a high speed aircraft, a turbojet engine having an air compressor; a liquid fuel tank exposed to the heat produced by skin friction whereby a portion of the fuel is vaporized to pressurize the fuel in the tank; means including a main supply conduit to supply liquid fuel from said fuel tank to the combustion chamber of the jet propulsion engine; and auxiliary fuel feeding means, operative in response to a pressure of the vaporized fuel above a predetermined minimum vapor pressure to supply vaporized fuel under pressure to the combustion chamber, said auxiliary fuel feeding means including an auxiliary supply conduit connected between the fuel tank and the combustion chamber, a normally closed throttle valve disposed in said auxiliary supply conduit, said valve being opened in response to a predetermined minimum vapor pressure in the fuel tank, a superheater in said auxiliary supply conduit downstream from said valve, a pump in said auxiliary supply conduit downstream from said superheater, and a connection between the discharge side of the compressor and the superheater to supply heated compressed air to the superheater in heat exchange relation with the vaporized fuel therein.

3. In a high speed aircraft, a jet propulsion engine; a liquid fuel tank exposed to the heat produced by skin friction whereby a portion of the fuel is vaporized to pressurize the fuel in the tank; means including a main supply conduit to supply liquid fuel from said fuel tank to the combustion chamber of the jet propulsion engine; and auxiliary fuel feeding means, operative in response to a pressure of the vaporized fuel above a predetermined vapor pressure to supply vaporized fuel under pressure to the combustion chamber, said auxiliary fuel feeding means including an auxiliary supply conduit connected between the fuel tank and the combustion chamber, a normally closed throttle valve disposed in said auxiliary supply conduit, said valve being opened in response to a predetermined minimum vapor pressure in the fuel tank, a continuously operating pump in said auxiliary supply conduit downstream from said valve, a bypass between the outlet and inlet of said pump, a normally open valve in said bypass, and an operative connection between said valves, whereby opening movement of said normally closed throttle valve produces a concurrent closing movement of said normally open bypass valve, and vice versa.

4. In a high speed aircraft, a jet propulsion engine; a liquid fuel tank exposed to the heat produced by skin friction whereby a portion of the fuel is vaporized to pressurize the fuel in the tank; means including a main supply conduit to supply liquid fuel from said fuel tank to the combustion chamber of the jet propulsion engine; and auxiliary fuel feeding means, operative in response to a pressure of the vaporized fuel above a predetermined vapor pressure to supply vaporized fuel under pressure to the combustion chamber, said auxiliary fuel feeding means including an auxiliary supply conduit connected between the fuel tank and the combustion chamber, a normally closed throttle valve disposed in said auxiliary supply conduit, said valve being opened in response to a predetermined minimum vapor pressure in the fuel tank, a centrifugal pump in said auxiliary supply conduit, downstream from said throttle valve, a valve controlled bypass around the pump, and a connection between the throttle and said bypass valve, whereby opening movement of the throttle valve causes closing movement of the bypass valve, and vice versa.

5. In a high speed aircraft, a jet propulsion engine; a liquid fuel tank exposed to the heat produced by skin friction whereby a portion of the fuel is vaporized to pressurize the fuel in the tank; means including a main supply conduit to supply liquid fuel from said fuel tank to the combustion chamber of the jet propulsion engine; and auxiliary fuel feeding means, operative in response to a pressure of the vaporized fuel above a predetermined vapor pressure to supply vaporized fuel under pressure to the combustion chamber, said auxiliary fuel feeding means including an auxiliary supply conduit connected between the fuel tank and the combustion chamber, a normally closed throttle valve disposed in said auxiliary supply conduit, said valve being opened in response to a predetermined minimum vapor pressure in the fuel tank, a superheater and a pump in said auxiliary supply conduit downstream from said throttle valve, means to supply a heated fluid to said throttle valve, a bypass interconnecting the pump outlet and the auxiliary supply conduit at a point between the superheater and the pump inlet, a normally open valve in said bypass, and an operative connection between said valves, whereby opening movement of said normally closed throttle valve produces a concurrent closing movement of said normally open bypass valve, and vice versa.

References Cited in the file of this patent

UNITED STATES PATENTS

| | | |
|---|---|---|
| 1,729,042 | Junkers | Sept. 24, 1929 |
| 2,907,527 | Cummings | Oct. 6, 1959 |
| 2,917,903 | Stineman | Dec. 22, 1959 |
| 2,941,372 | Taylor | June 21, 1960 |
| 2,974,475 | Kolfenbach et al. | Mar. 14, 1961 |
| 2,986,327 | Hunter | May 30, 1961 |

UNITED STATES PATENT OFFICE
CERTIFICATE OF CORRECTION

Patent No. 3,039,720                              June 19, 1962

Bruce N. Torell

It is hereby certified that error appears in the above numbered patent requiring correction and that the said Letters Patent should read as corrected below.

Column 6, line 22, for "throttle valve" read -- superheater --.

Signed and sealed this 9th day of October 1962.

(SEAL)
Attest:

ERNEST W. SWIDER
Attesting Officer

DAVID L. LADD
Commissioner of Patents